United States Patent [19]
Piety et al.

[11] Patent Number: 6,078,874
[45] Date of Patent: Jun. 20, 2000

[54] APPARATUS AND METHOD FOR MACHINE DATA COLLECTION

[75] Inventors: Richard W. Piety; Kenneth R. Piety; Daniel G. Simpson, all of Knoxville, Tenn.

[73] Assignee: CSI Technology, Inc., Wilmington, Del.

[21] Appl. No.: 09/128,844

[22] Filed: Aug. 4, 1998

[51] Int. Cl.[7] .................................................. G01M 7/00
[52] U.S. Cl. ........................ 702/122; 702/56; 702/189; 73/602; 73/660
[58] Field of Search .................................... 702/122, 141, 702/142, 130, 32, 56, 189, 190, 68; 364/708.1; 73/602, 660

[56] References Cited

U.S. PATENT DOCUMENTS

| | | | |
|---|---|---|---|
| 3,955,419 | 5/1976 | Barton et al. | 73/340 |
| 4,366,544 | 12/1982 | Shima et al. | 364/550 |
| 4,608,532 | 8/1986 | Ibar et al. | 324/73 |
| 5,005,142 | 4/1991 | Lipchak et al. | 364/550 |
| 5,109,700 | 5/1992 | Hicks | 73/602 |
| 5,162,725 | 11/1992 | Hodson et al. | 324/115 |
| 5,347,476 | 9/1994 | McBean, Sr. | 364/571.04 |
| 5,365,462 | 11/1994 | McBean, Sr. | 64/571.04 |
| 5,375,073 | 12/1994 | McBean | 364/571.01 |
| 5,377,128 | 12/1994 | McBean | 364/571.04 |
| 5,510,606 | 4/1996 | Worthington et al. | 235/472 |
| 5,633,811 | 5/1997 | Canada et al. | 364/576 |
| 5,710,815 | 1/1998 | Ming et al. | 380/20 |
| 5,726,911 | 3/1998 | Canada et al. | 702/32 |
| 5,805,474 | 9/1998 | Danielson et al. | 364/708.1 |
| 5,831,261 | 11/1998 | Plesko | 250/221 |
| 5,841,121 | 11/1998 | Koenck | 235/472 |
| 5,852,351 | 12/1998 | Canada et al. | 702/56 |
| 5,870,699 | 2/1999 | Canada et al. | 702/189 |
| 5,895,857 | 4/1999 | Robinson | 73/660 |

OTHER PUBLICATIONS

SPM Portable Instruments for Machine Condition Monitoring Brochure by SPM Instrument Inc. (Included 10 pages), 1997.
SPM Portable Instruments for Machine Condition Monitoring brochure by SPM Instrument, Inc.

*Primary Examiner*—Marc S. Hoff
*Assistant Examiner*—Bryan Bui
*Attorney, Agent, or Firm*—Luedeka, Neely & Graham, P.C

[57] ABSTRACT

An apparatus and method for machine data collection includes a hand-held personal computer (HPC) having route-based machine information data stored therein, and at least one hand-held sensor unit which includes a sensor for sensing an operating characteristic of the machine. The sensor unit includes a microcomputer for controlling the overall operation of the sensor unit, and a wireless communications port for wirelessly communicating with the HPC and/or other peripheral device. Wireless communications between the HPC and the sensor unit include uploading route-based machine information and instructions from the HPC to the sensor unit, and downloading collected sensor data from the sensor unit to the HPC. Data may also be manually input to the HPC, including reading from control panels and process gauges. All LCD visually displays information and instructions to the operator, and a set of headphones aurally informs and instructs the operator with regard to data collection. Data may be transmitted wirelessly from the sensor unit to the HPC as the data is being generated, or data may be stored in the sensor unit over multiple data measurement points and then downloaded to the HPC or other peripheral device. In a distributed database, the sensor unit is configured to read a bar code or memory module positioned adjacent a measurement point of the machine, and each memory module is used to store data corresponding to test point location, sensor unit analysis setup, alarm levels, route-based information, and the like.

46 Claims, 6 Drawing Sheets

APPARATUS AND METHOD FOR MACHINE DATA COLLECTION

BACKGROUND

1. Field of the Invention

The present invention relates generally to data collection systems. More particularly, the present invention relates to a system and method which employs multiple sensors to collect machine operating data.

2. Background of the Invention

Many types of machines are commonly employed in industrial and manufacturing facilities to provide the horsepower and motive forces needed for production. Because of the importance of these machines in meeting production requirements, an effective predictive maintenance program is usually essential to the success of the business. It is desirable to detect and locate faults while the machine is operating in its normal environment so as not to interfere with the production process. Taking the machine off line to perform predictive maintenance creates an undesirable and inefficient situation, requiring a back-up or redundant machine in order to prevent a shutdown of the production process.

Most predictive maintenance programs include the periodic collection of machine operating data. In a typical industrial facility, machine data collection is accomplished by monitoring certain physical operating characteristics of the machine, such as vibration and temperature levels, using electrical sensors such as accelerometers and temperature sensors which are placed in sensory contact with the machine. In general, this process utilizes intelligent data collection instruments to which a sensor is connected by cable. The instrument, sensors, and cables are carried by a technician from machine to machine in accordance with a preprogrammed "route" to acquire the desired data for each machine designated in the route. A typical route will include a list of machines, test points for each machine, setup parameters for the data collection instrument for each test point, and a specification of how data is to be acquired for each test point. Data is collected from each machine in the route and stored in the data collection instrument. After data collection is complete, the stored data is typically downloaded to a database on a workstation for storage and analysis.

In present data collection systems, the cables used to interconnect the data collection instrument and sensors have proven to be troublesome in many ways. For example, the cables can become entangled in rotating shafts, conveyor belts, V-belts, open gearing, etc., which could injure the data collection technician or damage the rotating equipment, or both. Thus, the cables are a potential hazard to the data collection technician as well as the equipment being monitored.

Another problem with the use of cables is that their failure rate increases the likelihood that bad or erroneous data will be received by the data collection instrument. Addressing the problems associated with a failed cable also delays the acquisition of data.

A further problem with the use of cables is that they are a constant source of annoyance to the data collection technician. For example, the technician must be constantly vigilant when climbing stairs and moving past rotating machinery to ensure that the cables are not stepped on or otherwise allowed to interfere with the machinery. The technician also must swap or change cables, connectors, and adaptors when obtaining various machine measurements with different types of sensors, such as vibration, temperature, and flux. This also makes the data collection process more time consuming.

Another problem associated with existing data collection systems and methods is accessibility of the machine operating data. Typically, the only way to access the data is through the base workstation containing the data or through another computer or device having access to the workstation. Direct access to the database is typically not available to machine operators and others in the field who often need the data, particularly when an anomalous machine operating condition is suspected. Moreover, the level of skill needed to collect machine operating data with existing instruments makes data collection by an untrained machine operator impractical.

Existing data collection systems also require loading the data collection instrument with setup codes, machine location, test point locations particular machines, and other such information each time data is collected. The collected data must also be downloaded to the workstation and stored in a database when data collection in accordance with the route is complete. When data is collected and stored in the database, it is common for data to be inadvertently collected from the wrong test point and/or mislabeled when stored in the database.

Therefore, there is a need for a machine data collection system which simplifies and accelerates the data collection process, requires minimal training on the part of the individual collecting the data, and reduces or eliminates the likelihood that data will be mislabeled or collected from the wrong test point. A further desirable aspect of such a system is to enable machine operators and other personnel to access collected machine data in the field.

SUMMARY OF THE INVENTION

The present invention eliminates the difficulties and disadvantages of the prior art by providing a hand-held sensor unit for use by an operator to acquire operating data from a machine. The sensor unit includes a housing dimensioned and configured for being hand-held by the operator. A first sensor is disposed in the housing for being placed in sensory contact with a machine at a measurement location to sense a first operating characteristic of the machine and to produce first sensor signals corresponding to the machine operating characteristic that is sensed. A microcomputer disposed in the housing includes memory and processes the sensor signals to produce processed sensor data. A wireless communications port is in electrical communication with the microcomputer to provide wireless communications between the microcomputer and a peripheral device. A power supply, such as a battery, supplies the sensor unit with electrical power.

Various other features may also be included in the sensor unit. For example, the sensor unit may be configured to include a conditioning circuit for receiving and processing the first sensor signals to produce conditioned sensor signals which are received by the microcomputer. The conditioned signal may be stored in memory by the microcomputer or wirelessly transmitted to a peripheral device for storage, or both. A switch may be employed to enable selection between a plurality of signal analysis circuits where at least one of the signal analysis circuits includes an integrator circuit.

The sensor unit may further include an indicator such as an LED to inform the operator when data acquisition is complete. The sensor unit may also include a second sensor, such as a bar code reader, for being placed in sensory contact with the machine to sense a second operating characteristic of the machine which is different than the first operating characteristic sensed by the first sensor. In one embodiment, the second sensor is a bar code reader for sensing information, such as machine identification and location, contained on a bar code.

A variety of sensor types may be employed in the practice of the invention. For example, the first sensor may be a vibration transducer which senses vibrations produced by the machine. Another sensor is a temperature sensor useful for sensing the temperature of the machine during operation. A flux sensor may also be used to sense magnetic leakage flux produced by the machine.

A user interface in the form of an LCD display may be employed to visually display data collection instructions and information to the operator. The user interface may also take the form of a set of wireless headphones which, when employed, essentially function as a peripheral device which communicates wirelessly with the sensor unit. Another peripheral device that may be employed is a hand-held personal computer or personal data assistant.

In another aspect of the invention, there is provided a multiple sensor data collection system for use by an operator in monitoring and collecting data from a machine. The system includes a base instrument dimensioned and configured for being hand-held by an operator and for receiving and storing data. The base instrument includes a base wireless communication port for transmitting and receiving wireless signals. A plurality of sensor units similar to or the same as the sensor unit described above are employed to sense a plurality of machine parameters or operating characteristics and to produce data corresponding to the sensed machine parameters. Each sensor unit includes a wireless communications port for transmitting signals corresponding to the data produced by the sensor units. Included in the plurality of sensor units is a first sensor unit having a sensor for sensing a first machine parameter and for producing first sensor signals, a converter for producing first electrical signals corresponding to the first sensor signals, a microprocessor for receiving and analyzing the first electrical signals and producing analyzed electrical data corresponding to the first machine parameter, and a first wireless communications port for producing and transmitting first wireless signals corresponding to the analyzed electrical data. The plurality of sensor units also includes a second sensor unit having a sensor for sensing a second machine parameter different than the first machine parameter and producing second sensor signals. The second sensor unit also includes a second wireless communications port for transmitting second wireless signals corresponding to the second sensor signals. Preferably, the base instrument is operable to receive at least one of the first and second wireless signals through the base wireless communications port and to produce and store machine data corresponding to at least one of the first and second sensed parameters of the machine.

The base instrument may also be operable to receive both the first and second wireless signals, and to produce and store first and second machine data corresponding to the first and second machine parameters, respectively. The base instrument may be further operable to receive and log information, such as process gauge readings, which is input by the operator.

The second sensor unit may include a tachometer for sensing movement of a rotating element of the machine and producing second sensor signals in the form of tachometer signals. For this configuration, the microprocessor is programmed to analyze the first electrical signals based on the tachometer signals.

The present invention also provides a method for collecting machine operating data. The method includes the steps of providing a plurality of hand-held sensor units where each sensor unit includes a microcomputer, a sensor in electrical communication with the microcomputer, and a wireless communications port for wirelessly communicating with a peripheral device. A base instrument, being dimensioned and configured for being hand-held, is also provided in accordance with the method. The base instrument includes a base wireless communications port for wirelessly communicating with one or more of the plurality of sensor units. The base instrument also includes a data collection route stored therein. At least one of the sensor units are placed in sensory contact with a machine in accordance with the data collection route so that the sensor unit senses an operating characteristic of the machine and produces a corresponding sensor signal which is received and processed by the microcomputer to produce machine data. The machine data is then wirelessly transmitted from the sensor unit to the base instrument.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings where:

DETAILED DESCRIPTION OF THE PREFERRED EMBODIMENT(S)

Figure 1:
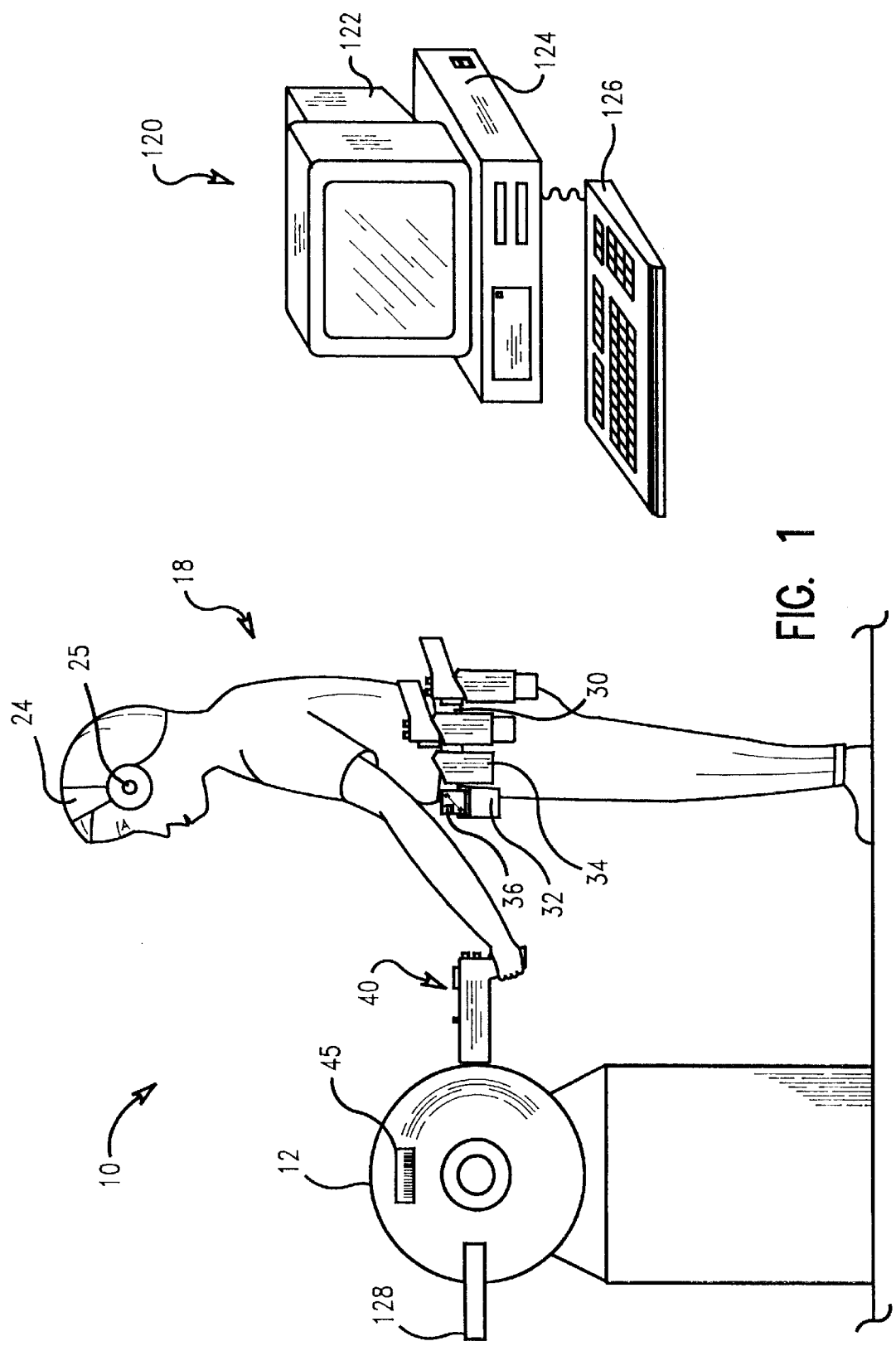
FIG. 1 is a side view of a machine data collection and monitoring system in accordance with the invention, showing an operator applying a hand-held sensor unit to a machine to collect data.

With reference now to the drawings in which like reference characters designate like or similar parts throughout the several views, FIG. 1 illustrates a machine data collection and monitoring system 10 for use by an operator to collect machine operating data from one or more machines 12. The system 10 includes at least one hand-held sensor unit 40 which is dimensioned and configured for being hand-held by the operator 18 in sensory contact with a machine 12 (such as an ac induction motor) during data acquisition. Sensory contact between the sensor unit 40 and machine 12 may be established by placing the sensor unit 40 in physical contact with a desired measurement point as shown in FIG. 1 in order to sense a machine operating characteristic such as vibration, or sensory contact may be established by placing the sensor unit 40 in close proximity to the machine 12 without establishing physical contact between the machine 12 and sensor unit 40 to enable the sensor unit 40 to sense a machine operating characteristic such as magnetic leakage flux. The sensor unit 40 preferably includes a handle 26 or other ergonomically advantageous gripping element to enhance user control of the sensor unit 40.

In a preferred embodiment, a base instrument 32 dimensioned and configured for being hand-held is used to instruct the sensor unit 40 with regard to machine data collection and to receive machine data obtained by the sensor unit 40. The base instrument 32 may also be used to log information and readings observed by the operator at control panels, process gauges, and the like. To enhance portability of the system 10, the operator 18 wears a utility belt 30 which includes holsters 34 configured to support a plurality of sensor units 40 and a base instrument 32.

The sensor unit 40 is preferably configured to perform fault analysis of sensor data. The base instrument 32 is also preferably configured to perform fault analysis as needed in the field. The base instrument 32 is a microprocessor-based instrument which includes memory (volatile and non-volatile), a bus line (address, control, and data) and associated hardware, software, and firmware required to perform the tasks of data manipulation, analysis, storage, display, and transmission. Preferably, the base instrument 32 also includes a base wireless communications port for transmitting and receiving wireless signals. Examples of available base instruments which may be used in the practice of the invention include a hand-held personal computer (HPC) such as a Sharp® HC-Y500 or Casio® A11. So-called "dynamic signal anlayzers", such as a CSI® Model 2120, may also be used in the practice of the invention. In a preferred embodiment, however, the base instrument is a HPC 32.

To provide information relative to the speed of the machine 12 or a rotating element of the machine, the system 10 may include a movement sensor 128 (e.g. a tachometer or encoder) which is positioned on or near the rotating machine element. As further described below, speed data provided by the tachometer may be synchronously averaged with vibration data for fault detection. If desired, the operator 18 may carry a pouch of adjustment or repair tools to affect repairs and adjustments to the machine 12 when an anomalous machine operating condition has been determined to exist.

Figure 2:
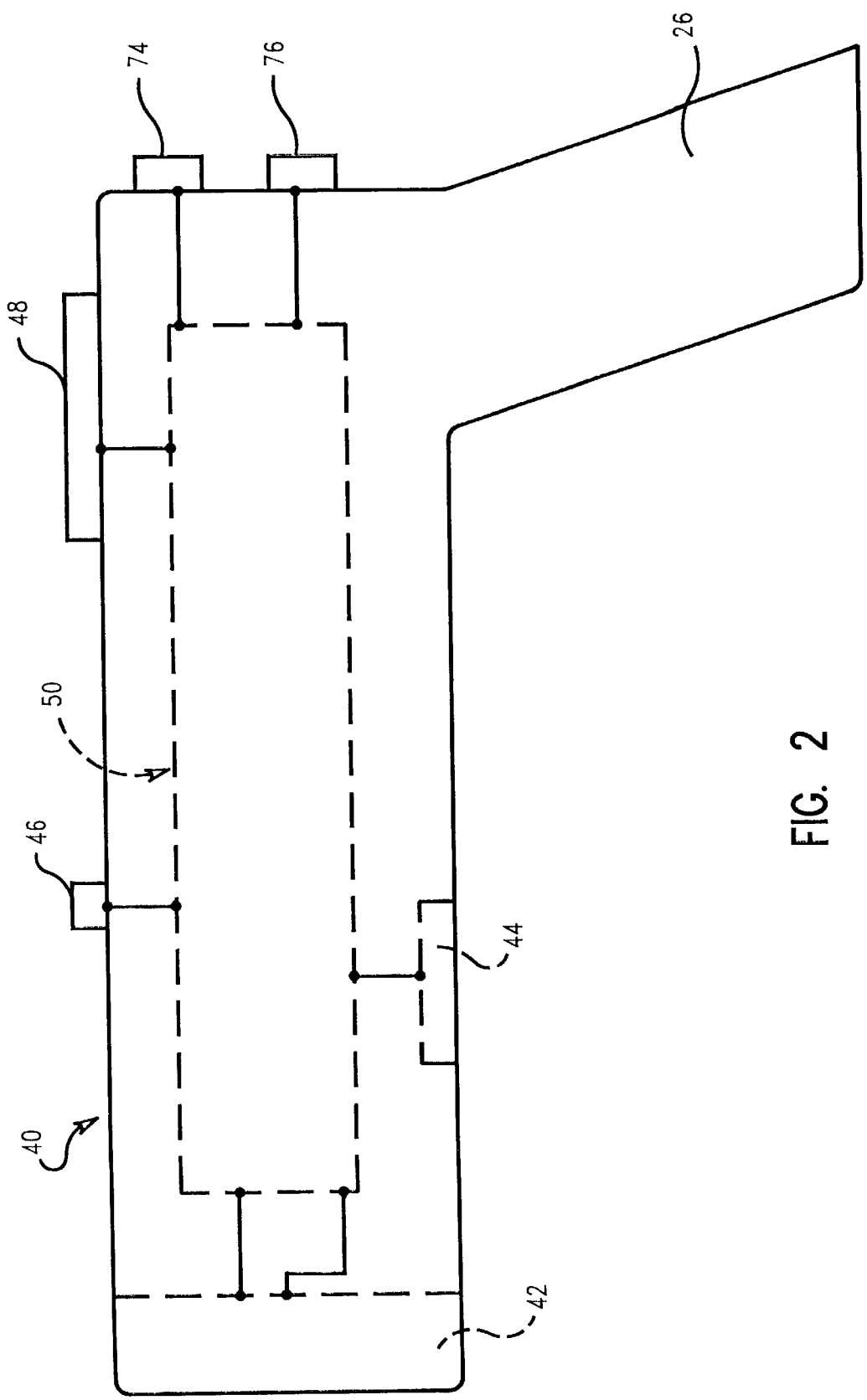
FIG. 2 is a side view of a hand-held sensor unit in accordance with the present invention.

As shown in FIG. 2, the hand-held sensor unit 40 includes a data collection engine 50 which controls the overall operation of the sensor unit 40. A preferred embodiment of the data collection engine 50, shown in greater detail in FIG. 3, includes a microcomputer 60 having a microprocessor 70. Microprocessor 70 is preferably a 16-bit microprocessor manufactured by Toshiba, Inc. under model number TMP93S/41. Timing for the microprocessor 70 is provided by clock signals generated by a real-time clock 62. Power to the sensor unit electronics is controlled by an on/off switch 74, and a data acquisition switch 76 is provided to initiate data acquisition by the sensor unit 40. The microcomputer 60 also includes various memory modules such as a 128 KB RAM 64 for storing software programs, a 256 KB RAM 66 for data storage, and an EPROM/FLASH memory module 68 containing boot ROM. It will be understood that the actual circuitry of the data collection engine 50 may vary depending on various considerations, including the type of sensor(s) employed in the sensor unit 40.

In electrical communication with the microprocessor 70 are one or more sensors 42 and 43, on/off switch 74, data acquisition switch 76, LCD 48, LED 46, and a wireless communications port 44. The data collection engine 50 also includes a power section 52 having a power source 54 (preferably a battery) coupled to a first end of a voltage divider 56 and to a power regulator and control circuit 58. A second end of the voltage divider 56 is coupled to ground. The output of voltage divider 56 is provided to an analog-to-digital (A/D) converter 110 (preferably a 12-bit converter) where the analog voltage signal is converted to digital format for use by the microprocessor 70. The output of the power regulator and control circuit 58 is also provided to the microprocessor 70 for powering the microcomputer 60.

The hand-held sensor unit 40 includes a primary sensor 42 electrically connected to the data collection engine 50. The primary sensor 42, which may also be the only sensor, is of a type capable of sensing a machine operating characteristic and producing a sensor signal corresponding to the machine operating characteristic that is sensed. For example, sensor 42 may be a vibration transducer which senses vibration produced by the machine 12. Examples of other sensors which may be employed as the primary sensor 42 include a flux sensor, temperature sensor, ultrasonic sensor, voltage sensor, current sensor, and movement sensor. The primary sensor 42 may also be a bar code reader for reading bar codes placed on machines.

In a preferred embodiment, sensor 42 includes signal conditioning circuitry for conditioning the sensor signals which are acquired and output by the sensor 42. For example, when sensor 42 is a vibration transducer, the vibration signal produced by the sensor 42 is preferably amplified and frequency filtered to improve signal-to-noise ratio before the signal is output to the microcomputer 60.

Figure 3:
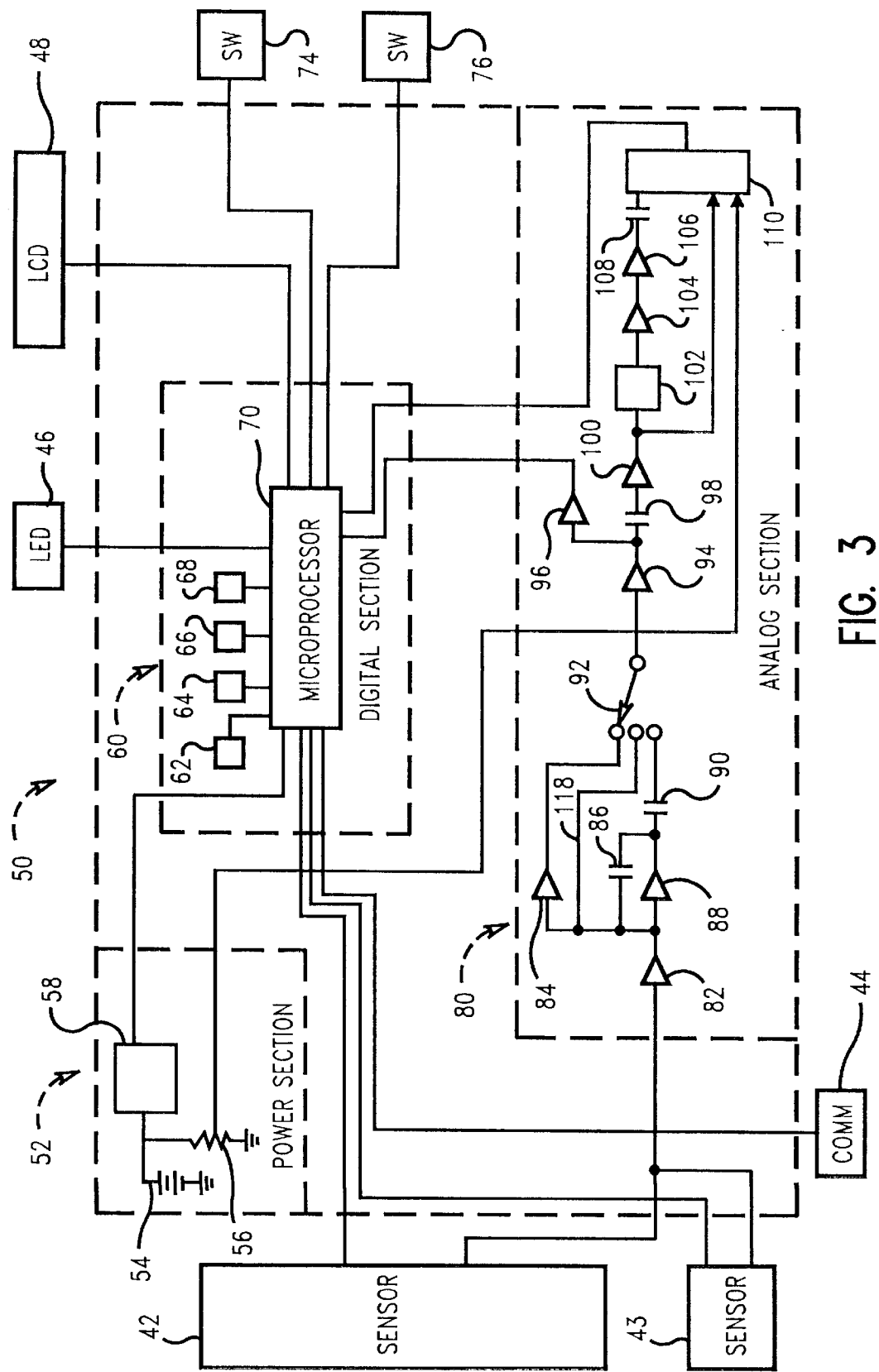
FIG. 3 is a schematic circuit diagram of the hand-held sensor unit of FIG. 2.

The hand-held sensor unit 40 may be configured to also include a secondary sensor 43 as shown in FIG. 3. Preferably, secondary sensor 43 is a different type of sensor than the primary sensor 42 so that the primary and secondary sensors 42, 43 sense different machine operating characteristics. Examples of sensor types suitable for use as a secondary sensor 43 include a vibration sensor, movement sensor, temperature sensor, ultrasonic sensor, voltage sensor, current sensor, and flux sensor. The secondary sensor 43 is in electrical contact with the same components of the hand-held sensor unit 40 as the primary sensor 42, as further discussed below. The secondary sensor 43 may also be a bar code reader for reading bar codes placed on machines.

When the sensor unit 40 includes a bar code reader as the secondary sensor 43, the operator 18 may employ the sensor unit 40 to read a bar code 45 which has been previously affixed to the machine 12. The bar code 45 may contain various measurement set-up information as well as machine identification and location information which the operator 18 should record to assist in identifying and analyzing the data. The operator 18 obtains the information contained in the bar code 45 by simply reading the bar code 45 with the sensor unit 40. Measurement information which the bar code 45 may contain includes the measurement location, measurement parameters needed or suggested for a given measurement location, and previously recorded machine data such as baseline data for a machine operating under normal conditions. In operation, the sensor unit 40 reads the information contained on the bar code 45 and transmits the information to the HPC 32. The HPC 32 determines from the bar code reading whether data should be taken, and if so, it further determines the type of data to be collected and the corresponding measurement point(s). The HPC 32 transmits this information to the sensor unit 40 which then displays the information to the operator 18. The sensor unit 40 then acquires, processes, and transmits the requested data to the HPC 32. If desired, several bar codes 45 may be affixed to a single machine 12 for data collection over multiple measurement points along the machine 12, and data may be stored in electronic memory 66 (FIG. 3) to enable data collection and data transmission to occur at different times, as further described below.

The sensor unit 40 includes a wireless communications port 44 in electrical communication with the data collection engine 50 to enable the sensor unit 40 to communicate with one or more peripheral devices, such as a HPC 32 and/or a set of wireless headphones 24. For example, the communications port 44 may be used to upload data acquisition instructions from and download data to, the HPC 32. In a preferred embodiment, the wireless communications port 44 is a serial infrared (IR) data port, such as a Hewlett Packard™ HDSL 2100. Alternatively, communications port 44 is a radio frequency (RF) port. An indicator device 46 such as a light emitting diode (LED) is mounted on the hand-held sensor unit 40 in electrical communication with engine 50. The indicator device 46 flashes or otherwise annunciates to the operator 18 when data acquisition is complete.

A user interface in the form of a liquid crystal display (LCD) 48 is also provided. In a preferred embodiment, the LCD 48 is a one-line character matrix in electrical communication with the data acquisition engine 50 to display a variety of information to the operator 18. For example, the LCD 48 displays data collection instructions received from the HPC 32 and displays the status of the data acquisition process. The LCD 48 also indicates when data acquisition is complete.

Another user interface in the form of a set of wireless headphones 24 may also be employed in the practice of the invention. The headphones 24 include a receiver 25 for receiving wireless signals transmitted by the sensor unit 40 or the HPC 32, or both. The wireless signals received by the headphone receiver 25 are converted to audible signals which can be perceived by the operator 18. In a preferred embodiment, the headphones 24 are used in conjunction with a vibration sensor, ultrasonic sensor, or stethoscope type sensor to listen to the signal produced by the sensor. Certain types of bearing faults, steam leaks, rubs, cavitation, and the like can generate characteristic sounds recognizable by the operator 18. The audible signals produced by the headphones 24 may also include signals which inform and instruct the operator 18 with regard to the state of various operations of the hand-held sensor unit 40. Examples of such signals include instructions as to the next data measurement point and information which lets the operator 18 know when data collection is complete.

The headphones 24 may also be used to inform the operator 18 with regard to the character of the data signals. For example, the sensor unit 40 may be programmed to perform fault analysis of signals produced by the primary sensor 42. When analysis of the sensor signals indicates the existence of an anomalous machine operating condition, an alarm signal may be transmitted to the headphones 24 to alert the operator 18 of the anomalous condition. The alarm signals transmitted by the sensor unit 40 may further inform the operator with regard to the severity of the anomalous condition.

An analog section 80 is included in the hand-held sensor unit 40 and is selectively powered on and off by the microprocessor 70 depending on whether the sensor 42 is acquiring data signals. To conserve power, the analog section 80 is in the active or ON state only when the sensor 42 is acquiring data. The analog section 80 includes a buffer 82 coupled to the primary sensor 42 at the buffer's input. The output of buffer 82 is coupled to three different electrical channels of operation. The first channel is peak detect and hold circuitry 84 as described in U.S. Pat. No. 5,895,857, entitled: "Machine Fault Detection Using Vibration Signal Peak Detection," issued Apr. 20, 1999, the entire contents of which is expressly incorporated herein by reference.

A second channel coupled to the output of buffer 82 is an electrically conductive path 118 which conducts the output of buffer 82 to amplifier 94. A third channel includes an operational amplifier 88 and associated feedback capacitor 86 which form an integrator. Buffer 82 is also coupled to the input of amplifier 88. Capacitor 90 provides further frequency filtering of the integrated signal.

A software controlled switch 92 is included in the analog section 80 for selectively switching between the three channels. Switch 92 is coupled to the output of the peak hold circuit 84, the electrically conductive path 118, and capacitor 90. Signals which are conducted through switch 92 are provided to the input of amplifier 94 and the output of amplifier 94 is coupled to a first end of capacitor 98 and a first end of an overload detection circuit 96. The output of the overload detection circuit 96 is coupled to the microprocessor 70 for interrupting normal processing of the microprocessor 70.

The overload detection circuit 96 includes a comparator which compares the output level of amplifier 92 to a predetermined threshold. When the output level of amplifier 92 is greater than the predetermined threshold, microprocessor 70 reduces the gain of amplifier 94. In similar fashion, microprocessor 70 increases the gain of amplifier 94 when the output level of amplifier 94 falls below the predetermined threshold.

A second end of capacitor 98 is coupled to a prefilter 100 which filters the signal to eliminate noise and unwanted frequency components. The output of capacitor 98 is received by a switched capacitive filter 102 which further filters the signal to eliminate undesired frequency components. The output of prefilter 100 is also provided to an A/D converter 110 where the signal is digitized for use by the microprocessor 70. The output of the switched capacitive filter 102 is provided to a post filter 104 which eliminates clock signals and other noise appearing at the output of the switched capacitive filter 102. The output of post filter 104 is coupled to the input of amplifier 106, and the output of amplifier 106 is provided to a capacitor 108. The output of capacitor 108 is provided to the A/D converter 110 where the signal is digitized and provided to the microprocessor 70.

One embodiment of the present system 10 includes a personal computer or base station computer 120, as shown in FIG. 1, which contains a data collection route stored in memory for being uploaded to the HPC 32. The base station computer 120 preferably includes a monitor 122, central processing unit 124, and keyboard 126 electrically coupled to the central processing unit 124. The data collection route typically includes data collection instructions which inform and instruct the HPC 32 and operator 18 with regard to which machines in the industrial setting to obtain data from and the type(s) of data to collect from each machine. Each machine in the route is identified by a unique identification character, and the location of each machine in the route is specified by a unique location character. Once the data collection route is defined at the base station computer 120, the route is uploaded to the HPC 32 via an RS232 connection or a wireless communications port and the system 10 is ready to begin data collection in accordance with the route.

During data collection, route-based instructions and data acquisition parameters are wirelessly communicated from the HPC 32 to the sensor unit 40. The sensor unit 40 then acquires the necessary machine operating data and wirelessly transmits the acquired data to the HPC 32. In one preferred embodiment, data is transmitted to the HPC 32 after collection at each measurement point. In another preferred embodiment, the sensor unit 40 is configured to acquire data over multiple measurement points and store the collected data in the sensor unit 40. The data is then transmitted to the HPC 32 or to a control room base computer 120. The capability of the sensor unit 40 to store data over multiple measurement points is particularly advantageous in situations where a machine is located in a high moisture area or other hazardous area where environmental or other elements may foul the HPC 32. Storing data over multiple measurement points is also useful in situations where the entire data collection route includes only a small number of measurement points.

While traversing the route of machines, the sensor unit 40 receives wireless transmissions from the HPC 32 for measurement set-up of the sensor unit 40. Such transmissions include signals for configuring memory registers, establishing the sampling rate of machine operating characteristics to be sensed, and establishing frequency settings for various filters. When set-up is complete, the operator 18 is prompted by the HPC 32 or, alternatively, by the sensor unit 40 to begin data acquisition of the particular machine parameters or operating characteristics. In response, the operator 18 places the sensor unit 40 in sensory contact with the machine 12 and depresses the data acquisition switch 76. Data signals sensed by the sensor unit 40 are stored in the sensor unit's memory and/or transmitted immediately to the HPC 32 for storage. When data acquisition is complete, an indicator device or LED 46 mounted on the hand-held sensor unit 40 is continuously illuminated or flashes to notify the operator 18 that receipt of the data signals is complete. Alternatively, the LED 46 could be included in the HPC 32. The HPC 32 may also be used by the operator 18 for manual logging of process gauge readings or other observations made by the operator 18 regarding operation of the machine 12.

The HPC's prompting of the sensor unit 40 for data in accordance with the route is typically dependent upon the type of machine being encountered in the route of machines and the particular type of sensor that is being used in the sensor unit 40. For example, for a sensor unit 40 having both a vibration sensor and a tachometer, the HPC 32 may prompt the sensor unit 40 to collect both types of machine operating characteristics, or the HPC 32 may prompt the sensor unit 40 to collect only one type of operating characteristic. After the requested data has been collected, the tachometer signal and/or vibration signal (or data derived by the sensor unit 40 from the two signals) is downloaded to the HPC 32 and stored in memory.

If desired, the operator 18 may also be notified when data acquisition is complete via the LCD 48. The LCD 48 may also be used to display instructions regarding the next measurement to be taken. At the end of the route, the operator 18 may download the collected data from the HPC 32 (or the sensor unit 40) to the signal analyzer 120, for further analysis and trending of the data. In a preferred embodiment, the signal analyzer 120 is programmed to conduct fault analysis of the collected data, including frequency analysis of spectral data obtained by fast Fourier transform (FFT) of the collected data.

In an alternate embodiment of the invention, microprocessor 70 is programmed to perform special signal processing such as demodulation, peak hold (as discussed above), and time synchronous averaging. For example, to perform time synchronous averaging of vibration data in accordance with the invention, a tachometer or other type of movement sensor 128 (FIG. 1) is mounted on or near the machine 12 and communicates wirelessly with the sensor unit 40 via the wireless communications port 44. The microprocessor 70 obtains a first set of data signals including vibration signals and tachometer signals. Using the tachometer signals, the microprocessor 70 synchronously averages the vibration signals and computes a frequency spectrum (preferably by fast Fourier transform) based on the synchronously averaged vibration signals. The resultant spectrum, or a portion thereof, is then downloaded to the HPC 32. Demodulation, which includes the process of acquiring (from a transmitted signal) modulated frequencies of interest which are then rectified and low pass filtered to separate the modulated frequencies.

Figure 4A:
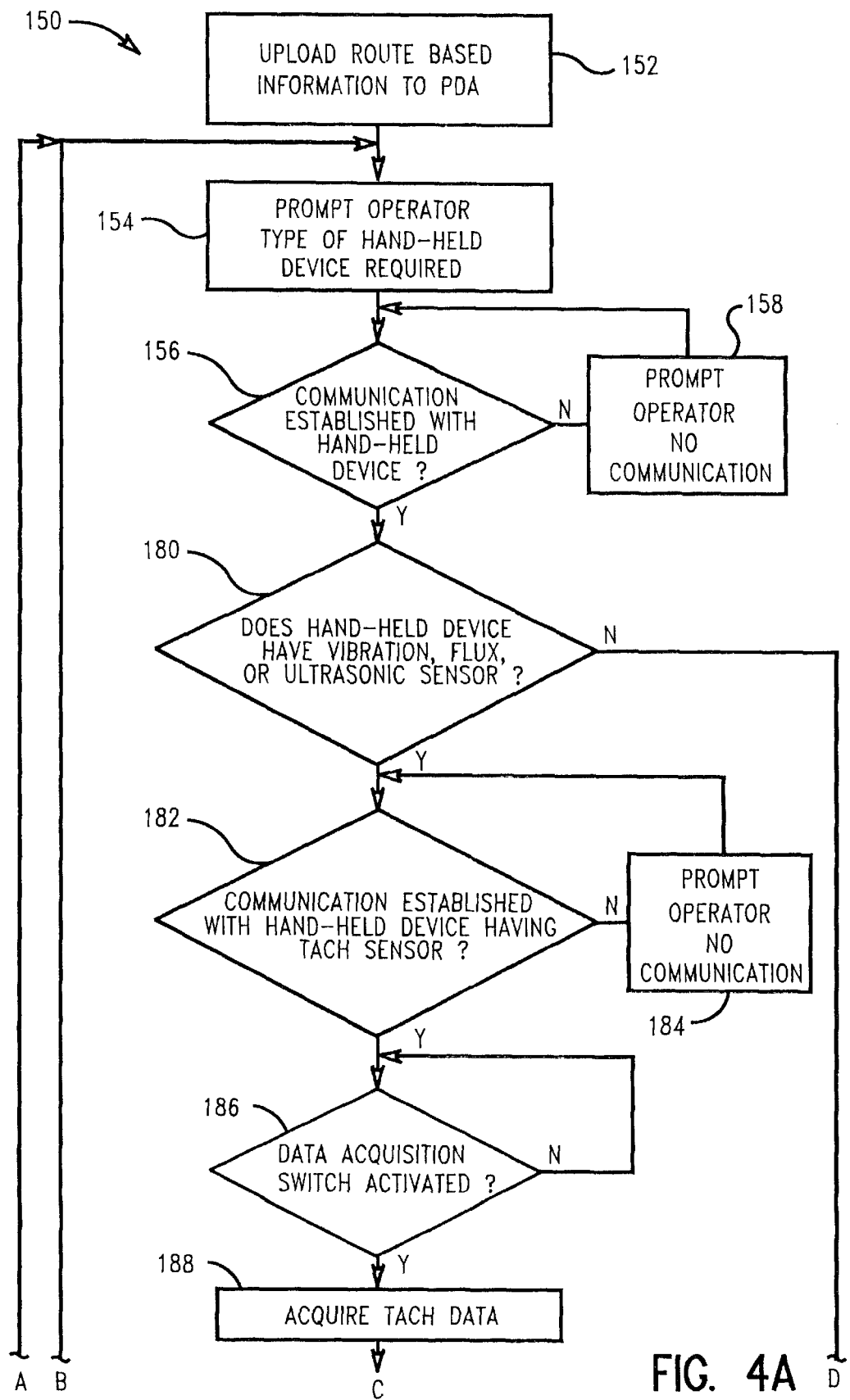
FIGS. 4A–C are a flow chart of a method for collecting machine data in accordance with the invention.
Figure 4B:
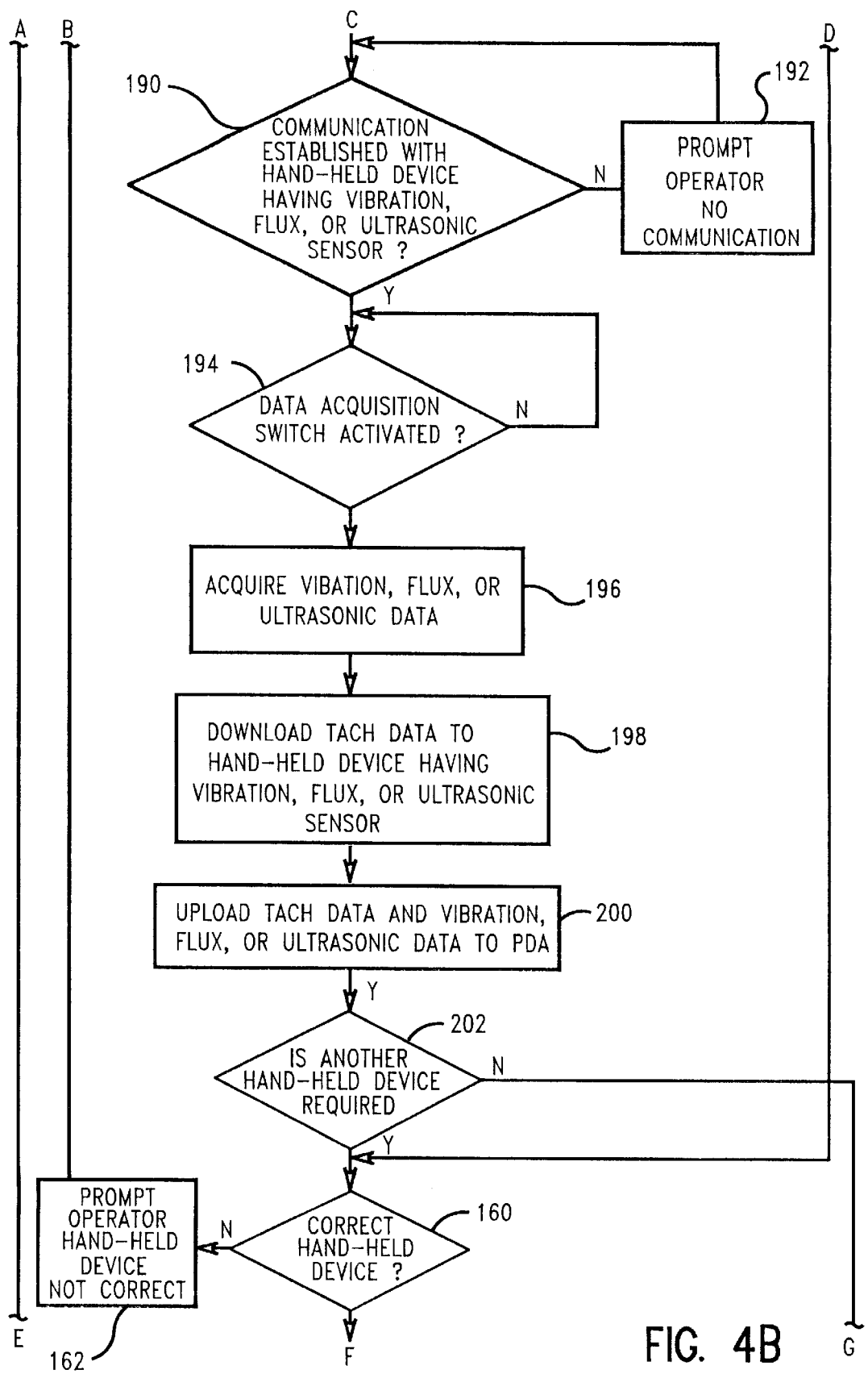
Figure 4C:
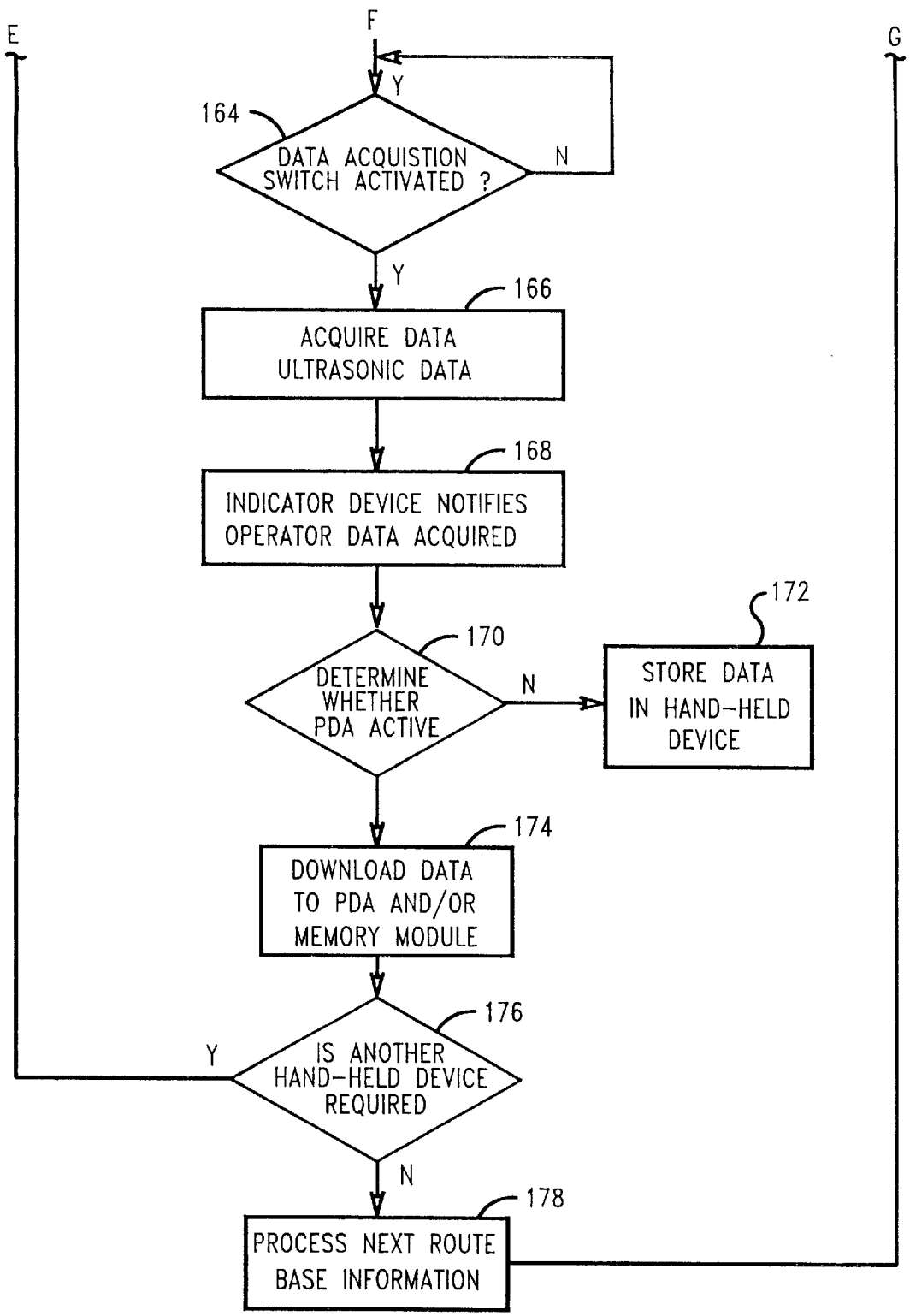

A process or method 150 of collecting data in accordance with the invention is shown in the flow diagram of FIGS. 4A–C. It will be understood that the described method is intended to illustrate one example of a preferred method for practicing the invention. For the sake of clarity, the usual fail-safe and check routines are omitted in this example. The method 150 begins in task block 152 whereby route-based machine information is uploaded to the HPC 32, preferably from the signal analyzer 120. At task block 154 the operator 18 is prompted or instructed by the HPC 32 as to the type of hand-held sensor unit 40 first required for collecting data from the first machine 12 in the route. The method next moves to decision block 156 where it is determined whether communication has been established with the sensor unit 40. Preferably, the sensor unit 40 communicates with both the HPC 32 and the tachometer 128 and reports its own operating condition as well as that of the tachometer 128 to the HPC 32. If communication has not been established, the method moves to task block 158 where the operator 18 is informed (by LCD 48 and/or headphones 24) that no communication has been established between the HPC 32 and the sensor unit 40. The method then returns to the top of decision block 156. If, however, it is determined in decision block 156 that communication has been established, the method 150 moves to decision block 180 where it is determined whether the sensor unit 40 includes a vibration, flux, or ultrasonic sensor disposed therein. If the answer in decision block 180 is no, the method moves to decision block 160, as shown in FIG. 4B, which is further discussed below. If it is determined that the hand-held sensor unit 40 contains a vibration, flux, or ultrasonic sensor, the method moves to decision block 182 where it is determined whether communication has been established between the sensor unit 40 and the tachometer 128. If communication has not been established, the method moves to task block 184 where the operator 18 is informed that communication has not been established. The method then moves to the top of decision block 182. If communication has been established between the hand-held sensor unit 40 and the tachometer 128, the method 150 moves to decision block 186 where it is determined whether the data acquisition switch 76 has been activated. If it has not, the method loops back to the top of decision block 186. If the data acquisition switch 76 has been activated, the method moves to task block 188 where tachometer data is acquired from the machine 12.

The method next moves to decision block 190, as shown in FIG. 4B, where it is determined whether communication has been established between the HPC 32 and one of the hand-held sensor units 40 having a vibration, flux, or ultrasonic sensor. If such communication has not been established, the method moves to task block 192 and the operator 18 is informed that no communication has been established. The method next loops back to the top of decision block 190. If communication has been established, the method moves to decision block 194 where it is determined whether the data acquisition switch 76 has been activated on the sensor unit 40 having the vibration, flux, or ultrasonic sensor. If the switch 76 has not been activated, the method loops back to the top of decision block 194. If the data acquisition switch 76 has been activated, the method 150 moves to task block 196 where the vibration, flux, or ultrasonic data is obtained from the machine 12 preferably in the form of a frequency spectrum. The method 150 next moves to task block 198 where the tachometer data is downloaded to the sensor unit 40 via the wireless communications port 44. This step, however, is preferably omitted in many applications. The method 150 next moves to decision block 200 where the tachometer data and the vibration, flux, or ultrasonic data is uploaded to the HPC 32. If at this time communication has not been established with the HPC 32 because the HPC 32 is not operational or within the communications range of the sensor unit 40, then the tachometer data and the vibration, flux, or ultrasonic data is stored within memory of the sensor unit 40. The method 150 next moves to decision block 202 where it is determined if another sensor unit 40 is required to take data readings of another parameter or operating characteristic of the particular machine 12 in the route. If another sensor unit 40 is not required, the method 150 moves to task block 178, as shown on FIG. 4C, where the HPC 32 prompts the operator 18 to proceed to the next machine 12 in the route. If it is determined that another sensor unit 40 is required to take different parameter readings from the machine 12, the method 150 moves to decision block 160.

In decision block 160, the method 150 determines whether the correct sensor unit 40 is being used by the operator 18, and if the answer is no, the method proceeds to task block 162 whereby the operator 18 is informed by the HPC 32 that the sensor unit 40 is not correct for the type of parameters required from the machine 12. The method 150 then loops back to the top of task block 154. If it is determined in decision block 160 that the correct sensor unit 40 is being used, the method moves to decision block 164 where it is determined whether the data acquisition switch 76 has been activated on the sensor unit 40. If the answer is no, the method loops back to the top of decision block 164. If the data acquisition switch 76 has been activated, the method proceeds to task block 166 where data is acquired from the machine 12. The method 150 next moves to task block 168 where an indicator device notifies the operator 18 that data acquisition is complete. The method 150 next moves to decision block 170 where it is determined whether the HPC 32 is active. If the answer in decision block 170 is no, the method proceeds to task block 172 where the data acquired is stored in the sensor unit 40 because the HPC 32 is not active at the present time. If it is determined in decision block 170 that the HPC 32 is active, the method 150 moves to task block 174 where the data obtained by the sensor unit 40 is downloaded to the HPC 32. The method next moves to decision block 176 whereby it is determined whether another sensor unit 40 is required to take data readings of another machine operating characteristic or parameter. If another sensor unit 40 is not required, the method 150 proceeds to task block 178 and the HPC 32 instructs the operator 18 to proceed to the next machine 12 in the route. If in block 176 it is determined that another sensor unit 40 is required, the method 150 proceeds to task block 154, which has been previously described.

In accordance with another aspect of the present invention, the data collection and monitoring system 10 includes memory modules 47a, 47b distributed at or near the various machine measurement points. Preferably, one memory module 47a, 47b is provided for each test point. For the purpose of clarity, only two memory modules 47a, 47b are shown in FIG. 1, but any number of memory modules 47a, 47b may be employed in the practice of the invention. Each memory module 47a, 47b, which is attached to the machine 12 or other nearby structure with a fastener such as an epoxy adhesive or other permanent or nonpermanent fastener, includes electronic memory for storing information to enhance machine data collection. An example of a memory module suitable for use in the practice of the invention is a Model No. DS1996LF5 iButton provided by Dallas Semiconductor, Inc. of Dallas, Tex.

To read data from or write data to a memory module 47a, 47b, the sensor unit 40 is configured to include a memory module reader as the secondary sensor 43. Suitable readers are available from Dynasys Technologies located in Clearwater, Fla. under Model No. P-1732. The memory module reader may be interfaced with the memory module 47a, 47b by simply touching the reader to the module. The reader is also configured to be inserted over the memory module 47a, 47b so that the reader will snap in and remain in place.

A variety of information may be stored in each memory module 47a, 47b in accordance with the practice of the invention. Information which may be stored in the memory modules 47a, 47b includes test point location and machine identification, types of data to be collected, data collection instrument setup instructions, route information instructing the operator 18 as to the next test point location from which to collect data, alarm levels, and the like. When the operator 18 establishes contact between the reader and the module 47a, 47b, the sensor unit 40 reads the test point identification information, configures measurement parameters (such as sample rate, filter settings, FFT, and type of fault analysis) in accordance with the setup instructions, and records alarm levels. Some information and instructions read from the memory module 47a, 47b may be displayed for the operator at the LCD 48 while detailed graphical displays such as vibration spectra are preferably transmitted to the HPC 32 for display. The location information is also used by the HPC 32 to ensure that collected data received from the sensor unit 40 is stored in the proper database location under the proper test point and machine headers. Thus, the test point location and machine identification information provided by the memory module 47a, 47b significantly reduces or eliminates the possibility that data will be collected from the wrong machine or test point or that collected data will be misidentified when stored in a database.

After all information and instructions have been read from the memory module 47a, 47b and the sensor unit 40 configured in accordance with the instructions, the operator places the sensor unit 40 in sensory contact with the test point and collects the required data. The collected data, which may include spectral data derived by fast Fourier transform (FFT), may be transmitted to the HPC 32 for storage and/or written to memory located in the memory module 47a, 47b. When machine data is stored in the memory module 47a, 47b, it is preferably that the data be stored in chronological fashion so that data for a most recent period of time, such as the past 1-year period, is stored in the memory module 47a, 47b. In this manner, the memory modules 47a, 47b function as a distributed database where machine data is distributed at each machine test point.

Several advantages are realized in a distributed database in accordance with the invention. For example, when a maintenance technician or machine operator suspects that a machine is not operating properly because the machine is producing excessive noise, the machine operator simply touches the sensor unit 40 to the memory module 47a, 47b to read the stored information, instructions, and most recent historical machine data. In many such cases when an anomalous machine operating condition is suspected, it may be desirable to collect and analyze data to determine if a machine operating characteristic is in alarm. To do so, the machine operator simply places the sensor unit 40 (after contacting the sensor unit 40 with the memory module 47a, 47b and reading its stored setup and data collection instructions) in sensory contact with the test point and initiates data acquisition by depressing the data acquisition switch 76. If any of the measured data meets an alarm threshold, an alarm condition will be displayed on the LCD 48. Data may also be collected using only the sensor unit 40 and then taken by the machine operator to the central maintenance group for further analysis. This type of data collection system and method requires very little training on the part of the machine operator since test point location, machine identification, analysis types, setup instructions, route information, and alarm thresholds are all stored in the memory module 47a, 47b and can be automatically loaded into the sensor unit 40 by simply touching the sensor unit 40 to the memory module 47a, 47b.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A hand-held sensor unit for use by an operator to acquire operating data from a machine and for communicating acquired operating data to a peripheral device capable of wireless communications, the sensor unit comprising:

a housing configured for being hand held by an operator;

a first sensor disposed in said housing for being placed in sensory contact with a machine at a measurement location to sense a first operating characteristic of the machine during data acquisition, producing first sensor signals corresponding to the machine operating characteristic that is sensed;

a microcomputer, including memory, disposed in said housing in electrical communication with said first sensor to receive and process sensor signals, producing processed sensor data;

a wireless communications port in electrical communication with said microcomputer to provide wireless communications between the microcomputer and the peripheral device; and a power supply disposed in said housing for supplying electrical power to the sensor unit;

wherein said housing is dimensioned and configured for being hand-held by an operator during acquisition of data with said first sensor.

2. The sensor unit of claim 1, further comprising a conditioning circuit for receiving and processing first sensor signals to produce conditioned sensor signals, said conditioned sensor signals being received by said microcomputer.

3. The sensor unit of claim 2 wherein said conditioned sensor signals are stored in memory by said microcomputer.

4. The sensor unit of claim 2 wherein said conditioned sensor signals are wirelessly transmitted by said wireless communications port to the peripheral device.

5. The sensor unit of claim 2 wherein said conditioning circuit includes a switch for selecting between a plurality of signal analysis circuits, at least one of said plurality of signal analysis circuits including an integrator for integrating said first sensor signals.

6. The sensor unit of claim 5 wherein said plurality of signal analysis circuits further includes a peak detect and hold circuit.

7. The sensor unit of claim 1, further comprising an indicator in electrical communication with said microcomputer for indicating to the operator when data acquisition is complete.

8. The sensor unit of claim 1, further comprising a display in electrical communication with said microcomputer for displaying the status of data acquisition.

9. The sensor unit of claim 1 wherein said wireless communications interface includes a serial infrared data port.

10. The sensor unit of claim 1 wherein said peripheral device includes a hand-held personal computer or dynamic signal analyzer for transmitting wireless signals to said wireless communications port and for receiving wireless signals transmitted by said wireless communications port.

11. The sensor unit of claim 1 wherein said peripheral device includes headphones for being worn by an operator, said headphones including a receiver for receiving wireless signals transmitted by said wireless communications port and converting the wireless signals to audible signals for being perceived by the operator.

12. The sensor unit of claim 1 wherein said wireless communications port is further operable to receive processed sensor signals from said microcomputer and convert said processed sensor signals to wireless signals which are output by the wireless communications port.

13. The sensor unit of claim 12 wherein said peripheral device includes a hand-held personal computer or dynamic signal analyzer.

14. The sensor unit of claim 12 wherein said peripheral device includes headphones for being worn by the operator.

15. The sensor unit of claim 1, further comprising a second sensor disposed in said housing for being placed in sensory contact at a measurement location to sense a second operating characteristic of the machine that is different than the first operating characteristic.

16. The sensor unit of claim 15 wherein said second sensor includes a bar code reader.

17. A multiple sensor data collection system for use by an operator in monitoring and collecting data from a machine, the system comprising:

a base instrument dimensioned and configured for being hand-held by an operator during data acquisition and for receiving and storing data, the base instrument including a data collection route stored therein and a base wireless communication port for transmitting and receiving wireless signals;

a plurality of sensor units for sensing a plurality of machine parameters and for producing data corresponding to the sensed machine parameters, each sensor unit including a wireless communications port for receiving route-based data collection instructions from the base instrument and transmitting signals corresponding to the data produced by the sensor units according to route-based data collection instructions, each sensor unit being dimensioned and configured for being hand-held during data acquisition, said plurality of sensor units including:

(1) a first sensor unit having a sensor for sensing a first machine parameter according to route-based data collection instructions received from the base instrument and producing first sensor signals, a converter for producing first electrical signals corresponding to the first sensor signals, a microprocessor for receiving and analyzing the first electrical signals and producing analyzed electrical data corresponding to the first machine parameter, and a first wireless communications port for producing and transmitting first wireless signals corresponding to the analyzed electrical data; and (2) a second sensor unit having a sensor for sensing a second machine parameter different from the first machine parameter according to route-based data collection instructions received from the base instrument and producing second sensor signals, and a second wireless communications port for transmitting second wireless signals corresponding to the second sensor signals;

wherein said base instrument is operable to receive at least one of the first and second wireless signals through the base wireless communications port and to produce and store machine data corresponding to at least one of the first and second sensed parameters of the machine.

18. The system of claim 17 wherein said base instrument is operable to receive both the first and second wireless signals, and to produce and store first and second machine data corresponding to the first and second machine parameters, respectively.

19. The system of claim 17 wherein said base instrument is operable to receive and log information which is input by the operator.

20. The system of claim 17 wherein said first sensor unit is operable to receive the second wireless signals through the first wireless communications port, the converter is operable to convert the second wireless signals into second electrical signals, and wherein the microprocessor is operable to analyze the first electrical signals based on the second electrical signals to produce the analyzed electrical data.

21. The system of claim 20 wherein the second machine parameter corresponds to movement of the machine and wherein the microprocessor is operable to analyze the first electrical signals as a function of the movement of the machine.

22. The system of claim 21 wherein the second sensor unit further comprises a tachometer and the second sensor signals correspond to the speed of a rotating element of the machine.

23. The system of claim 17 wherein said base instrument is further operable to instruct a sensor unit through route-based data collection instructions to sense one machine parameter and to transmit wireless signals corresponding to said one machine parameter each time route-based data collection instructions are transmitted to the sensor unit.

24. The system of claim 17 wherein said base instrument is further operable to instruct a sensor unit through route-based data collection instructions to sense and store a plurality of machine parameters and to transmit wireless signals corresponding to said plurality of machine parameters each time route-based data collection instructions are transmitted to the sensor unit.

25. A multiple sensor data collection system for use by an operator in monitoring a machine, the system comprising:

a microprocessor-based instrument having a data collection route stored therein and including a base wireless communications port;

a first hand-held sensor unit dimensioned and configured for being hand-held during data acquisition, said first hand-held sensor unit including:

a first microprocessor secured therein, a first wireless communications port mounted on the first hand-held sensor unit and in electrical communication with the first microprocessor, the microprocessor-based instrument being operable to transmit route-based data collection instructions to the first microprocessor via the base wireless communications port and the first wireless communications port; and a first sensor mounted on the first hand-held sensor unit and in electrical communication with the first microprocessor for sensing a machine operating characteristic according to route-based data collection instructions and producing first sensor signals corresponding to the machine operating characteristic that is sensed, the first hand-held sensor unit being further operable to transmit a first set of data signals corresponding to the first sensor signals via the first wireless communications port; and a second hand-held sensor unit dimensioned and configured for being hand-held during data acquisition, said second hand-held sensor unit including:

a second microprocessor secured therein;

a second wireless communications port mounted on the second hand-held sensor unit and in electrical communication with the second microprocessor of the second hand-held sensor unit, the microprocessor-based instrument being operable to transmit route-based data collection instructions to the second microprocessor of the second hand-held sensor unit via the base wireless communications port and the second communications port of the second hand-held sensor unit; and a second sensor mounted on the second hand-held sensor unit and in electrical communication with the second microprocessor of the second hand-held sensor unit for sensing a machine operating characteristic according to route-based data collection instructions and producing second sensor signals corresponding to the machine operating characteristic that is sensed, the second hand-held sensor unit being further operable to transmit a second set of data signals corresponding to the second sensor signals via the second wireless communications port.

26. The system of claim 25 wherein said first hand-held sensor unit further comprises means for demodulating the first sensor signals to produce first demodulated sensor signals.

27. The system of claim 25 wherein said first sensor includes a tachometer for sensing the speed of a rotating element of the machine and for producing tachometer signals which are wirelessly transmitted by the first wireless communications port.

28. The system of claim 25 wherein said second wireless communications port is further operable to receive tachometer signals transmitted by the first wireless communications port, said tachometer signals being received by the second microprocessor and synchronously averaged with said second sensor signals to produce synchronously averaged data.

29. The system of claim 25 wherein at least one of the first and second hand-held sensor units computes Fourier Transforms based on at least one of the first and second sets of data signals.

30. The system of claim 25 further including wireless headphones worn by the operator for producing audible signals corresponding to signals produced by the first and second wireless communications ports.

31. The system of claim 30 wherein the first sensor is an ultrasonic sensor and the headphones produce audible signals corresponding to sensor signals produced by the ultrasonic sensor.

32. The system of claim 25 wherein said microprocessor-based instrument is further operable to instruct a sensor unit through route-based data collection instructions to sense one machine operating characteristic and to transmit wireless signals corresponding to said one machine operating characteristic each time route-based data collection instructions are transmitted to the sensor unit.

33. The system of claim 25 wherein said microprocessor-based instrument is further operable to instruct a sensor unit through route-based data collection instructions to sense and store a plurality of machine operating characteristics and to transmit wireless signals corresponding to said plurality of machine operating characteristics each time route-based data collection instructions are transmitted to the sensor unit.

34. A multiple sensor data collection system for use by an operator in monitoring a machine, the system comprising:
- a microprocessor-based instrument having a data collection route stored therein and including a wireless instrument communications port; and
- a hand-held sensor unit being dimensioned and configured for being hand-held during data acquisition, said hand-held sensor unit including:
  - a microcomputer;
  - a power source disposed in the sensor unit for powering the sensor unit;
  - an LED in electrical communication with the microprocessor for notifying the operator when receipt of the data signals is complete;
  - a display in electrical communication with the microcomputer for displaying data collection instructions and information to the operator;
  - a data acquisition switch in electrical communication with the microcomputer for initiating data collection;
  - a wireless communications port in electrical communication with the microcomputer, the microprocessor-based instrument being operable to transmit route-based data collection instructions to the microcomputer via the wireless instrument communications port and the sensor unit wireless communications port; and
  - a sensor disposed in the sensor unit for sensing an operating characteristic of the machine and producing sensor signals corresponding the machine operating characteristic that is sensed, said sensor being in electrical communication with the microcomputer for sending sensor signals to the microcomputer.

35. The system of claim 34 wherein said hand-held sensor unit is further operable to demodulate wireless signals received from the microprocessor-based instrument.

36. The system of claim 34 wherein said microcomputer performs time synchronous averaging of sensor data corresponding to the sensed signals from the sensor.

37. The system of claim 36, further comprising a movement sensor for sensing the speed of a rotating element of the machine and producing movement sensor signals corresponding thereto.

38. The system of claim 34 wherein said microcomputer is further operable to compute a fast Fourier transform of sensor signals for fault detection.

39. The system of claim 34, further comprising a set of wireless headphones for being worn by an operator, said headphones including a receiver for receiving wireless signals transmitted by said wireless communications port and converting the wireless signals to audible signals for being perceived by the operator.

40. The system of claim 34 wherein said microprocessor-based instrument is further operable to instruct the first hand-held sensor unit through route-based data collection instructions to sense one machine operating characteristic and to transmit wireless signals corresponding to said one machine operating characteristic each time route-based data collection instructions are transmitted to the first hand-held sensor unit.

41. The system of claim 34 wherein said microprocessor-based instrument is further operable to instruct the first hand-held sensor unit through route-based data collection instructions to sense and store a plurality of machine operating characteristics and to transmit wireless signals corresponding to said plurality of machine operating characteristics each time route-based data collection instructions are transmitted to the first hand-held sensor unit.

42. A method for collecting machine operating data comprising the steps of:
- providing a plurality of hand-held sensor units, each of said plurality of hand-held sensor units being dimensioned and configured to be hand-held during data acquisition and having a microcomputer, a sensor in electrical communication with the microcomputer, and a wireless communications port for wirelessly communicating with a peripheral device;
- providing a base instrument dimensioned and configured to be hand-held and having a base wireless communications port for wirelessly communicating with one or more of said plurality of sensor units, said base instrument having a data collection route stored therein;
- wirelessly transmitting route-based data collection instructions from the base instrument to at least one of the hand-held sensor units;
- taking a data measurement by placing said at least one of the hand-held sensor units in sensory contact with a machine in accordance with route-based data collection instructions so that said sensor unit senses an operating characteristic of the machine and produces a corresponding sensor signal which is received and processed by the microcomputer to produce machine data; and
- wirelessly transmitting machine data from said at least one of the hand-held sensor units to the base instrument.

43. The method of claim 42, further comprising the step of storing machine date in a sensor unit before transmitting the stored sensor data to the base instrument.

44. The method of claim 42, further comprising the step of storing transmitted machine data in the base instrument.

45. The method of claim 42, further comprising the step of computing a fast Fourier transform of sensor data in a sensor unit to produce machine data which is wirelessly transmitted to the base instrument.

46. The method of claim 42, further comprising the step of transmitting machine data to the base instrument after each data measurement is taken.

* * * * *